UNITED STATES PATENT OFFICE.

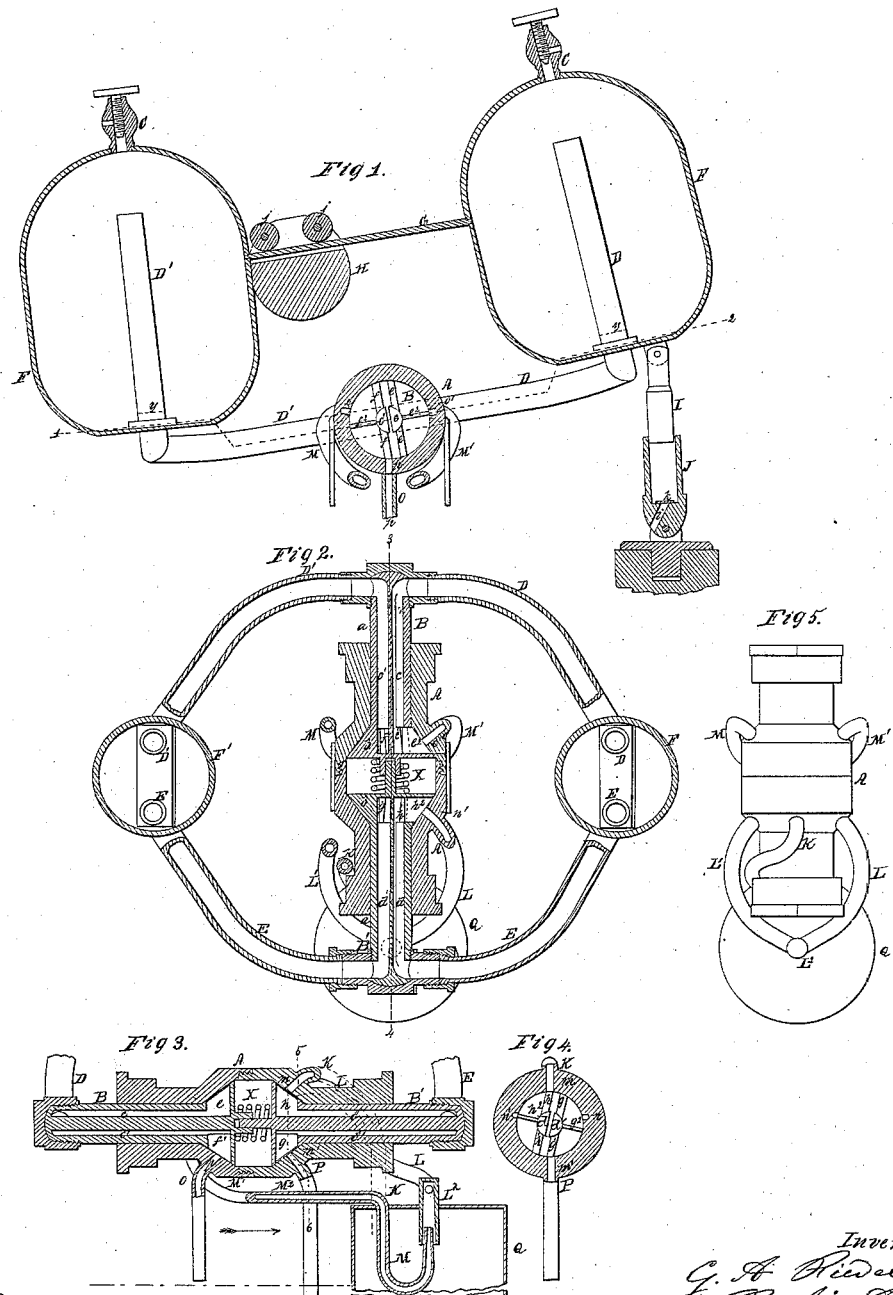

G. A. RIEDEL, OF PHILADELPHIA, PENNSYLVANIA.

IMPROVEMENT IN AUTOMATIC BOILER-FEEDERS.

Specification forming part of Letters Patent No. 56,096, dated July 3, 1866.

*To all whom it may concern:*

Be it known that I, G. ADOLPH RIEDEL, of Philadelphia, Pennsylvania, have invented an Improvement in Automatic Boiler-Feeders; and I do hereby declare the following to be a full, clear, and exact description of the same, reference being had to the accompanying drawings, and to the letters of reference marked thereon.

My invention consists of certain improvements, fully described hereinafter, in the automatic feed apparatus for which Letters Patent were granted to me on the 19th day of September, 1865.

In order to enable others skilled in the art to make and apply my invention, I will now proceed to describe its construction and operation.

On reference to the accompanying drawings, which form a part of this specification, Figure 1 is a sectional elevation of my improved automatic boiler-feeder; Fig. 2, a sectional plan on the line 1 2, Fig. 1; Fig. 3, a section on the line 3 4, Fig. 2; Fig. 4, a section on the line 5 6, Fig. 3, looking in the direction of the arrow, and Fig. 5 a plan view of part of the apparatus.

Similar letters refer to similar parts throughout the several views.

Within a casing or chest, A, are two valves, B B', each of which has a cylindrical stem, $a$, and a conical head, $b$, adapted to a seat in the chamber X, in the center of the chest.

In the valve B are two parallel channels, $c\ c'$, the channel $c$ communicating with ports, $e\ e'$, and $e^2$ in the head $b$, and the channel $c'$ communicating with similar ports $f, f'$, and $f^2$ in the same head. (See Figs. 1 and 2.)

In the stem of the valve B' are channels $d\ d'$, the former communicating with ports $h, h'$, and $h^2$ in the head $b$ of the valve, and the latter with similar ports $g, g'$, and $g^2$ in the same head.

To the end of the stem of the valve B are connected two curved pipes, D D', the pipe D communicating with the channel $c$ and the pipe D' with the channel $c'$, and to the stem of the valve B' are connected two pipes, E and E', the former communicating with the channel $d$, and the latter with the channel $d'$.

The ends of the pipes D and E project through the bottom of a metal casing or reservoir, F, and the pipes D' E' project through the bottom of a similar casing or reservoir, F', the pipes D and D' extending nearly to the top of their respective reservoirs, while neither of the pipes E or E' extend above the dotted lines $y$, Fig. 1.

In the top of each reservoir is a stop-valve, C, and between the two reservoirs extends a bar, G, on which a metal weight or ball, H, furnished with rollers $j\ j$, is arranged to slide, under the circumstances described hereinafter.

To the under side of each reservoir is hung a plunger, I, (one only being shown in the drawings,) which fits freely in a cylinder, J, the latter being hinged at the lower end to any stationary object, and being furnished with a valve, $k$, for closing or exposing the opening $i$.

In the case A are openings $m\ m', n\ n', o\ o'$, and $p$, with which communicate pipes K, L L', M M', O, and P.

The pipes L L' communicate with a pipe, $L^2$, which extends into a tank, Q, Fig. 3, and the pipes M M' communicate with a pipe $M^2$, which also extends into the tank, and is bent upward, so that its end shall project a short distance into the pipe $L^2$, the end of the pipe $M^2$ being reduced in diameter, so that there shall be an annular space between it and the pipe $L^2$.

As the valves B B', pipes D D', E E', and the reservoirs F F' are connected together, the elevation or depression of either of the reservoirs will cause the said valves to turn in one direction or the other in the chest A, which is stationary, and this movement of the valves is so restricted that when the reservoirs are at the limit of their movement in either direction one of the ports, $e'$ or $f'$, will be in communication with the opening $p$, and one of the ports, $g$ or $h$, will be in communication with the opening $m$.

When the reservoir F' is depressed and the reservoir F consequently elevated, as seen in Fig. 1, the port $f'$ of the valve B will coincide with the opening $p$, while the ports $h\ g'\ h^2$ of the valve B' will be opposite the openings $m\ m'\ n'$, as shown in Figs. 1 and 4. When the reservoir F' is elevated the ports $f^2$ and $e'$ will communicate with the openings $o$ and $p$, while the ports $g\ h'\ g^2$ will communicate with the openings $m\ m'\ n$.

The tank Q is maintained nearly full of water under pressure by any suitable means, and the pipe P communicates with a steam-boiler at a point below the proper level of the water, the pipe O extending to the water-line.

Supposing the operating parts of the apparatus to be in the position shown in Fig. 1, the valve C of the reservoir F is opened, when the water in the tank Q will flow through the pipe K, port $m$, opening $h$, and channel $d$ in the valve B', and through the pipe E into the reservoir F until the latter is filled nearly to the top of the pipe D, after which the valve C is closed. When the weight of the water in the reservoir F, in the first instance, overcomes the combined weight of the reservoir F' and the weight H, the reservoir F will descend and the reservoir F' will rise, the tendency of the two reservoirs being to balance each other. The momentum acquired by the descending reservoir F, however, is sufficient to carry it a short distance below the reservoir F', when the weight H will slide toward the lowest reservoir, and will cause the latter to descend to the limit of its downward motion. The water now flows into the port $g$, (which is opposite the opening $m$,) and through the channel $d'$ and pipe E', into the elevated reservoir F', while the steam passes from the pipe O, through the port $e'$, channel $c$, and pipe D, into the reservoir F, and the water in the latter flows through the pipe E, opening $d$, port $h'$, opening $m'$, and pipe P into the boiler. So long as there is any water in the reservoir F its weight, with that of the ball H, will maintain it in its depressed position. When, however, the water has all passed to the boiler and the reservoir F' is filled, the weight of the water in the latter will cause it to descend. The momentum it acquires will carry it below the reservoir F, and the weight H will pass to the opposite end of the bar G, this additional weight depressing the reservoir to the limit of its downward motion. The steam will now pass through the port $f'$, channel $c'$, and pipe D' into the reservoir F', and the water in the latter will flow through the tube E', channel $d'$, port $g'$, opening $m'$, and pipe P to the boiler.

As the reservoir F' reaches the limit of its downward movement the port $e^2$ will be brought opposite the opening $o'$, and the steam in the reservoir F will flow through the pipe D, opening $c$, port $e^2$, opening $o'$, and pipes M' and M$^2$, and will pass from the latter in a jet into the pipe L$^2$.

As the jet of steam passes into the pipe L$^2$ it carries with it a portion of water from the tank Q, and forces it through the pipe L, opening $n'$, port $h^2$, channel $d$, and tube E into the reservoir F, the jet of cool water thus injected into the reservoir condensing the steam in the latter and causing a partial vacuum, which assists the immediate flow of water into the reservoir, the water passing through the port $h$, channel $d$, and pipe E, as first described.

As the reservoir F is raised the valve $k$ opens and permits the air to flow freely into the cylinder J. When the reservoir descends, however, the air in the cylinder, which can only escape through the limited space between the cylinder and the plunger, acts as a very gentle cushion, and prevents the motion of the reservoir from being arrested so suddenly as to jar or strain any of the parts of the machine. This cushion arrangement should be used in connection with both reservoirs.

In place of a cylinder and plunger used with each reservoir, a single cylinder with an ordinary piston and piston-rod may be employed, two openings provided with valves being made in the cylinder, so as to gently retard the motion of the piston in either direction.

The above-described apparatus will continue to operate automatically so long as the water in the boiler is below its proper level. When, however, the water rises above this line and closes the end of the pipe O, the water in the reservoir destined to replenish the boiler is prevented from escaping and is retained until, on the decrease of the water in the boiler, the end of the pipe O is exposed to steam only. It will be seen, therefore, without further description, that the water in the boiler controls the movement of the apparatus, which tends to maintain that water at a uniform level.

It will be evident to those familiar with the construction and operation of mechanism of this class that the form and arrangement of the reservoirs and communicating-pipes may be modified without departing from the main features of my invention, and that valves and ports differing from those described may be used in connection with the reservoirs for accomplishing the object described above.

I claim as my invention and desire to secure by Letters Patent—

1. The two reservoirs F and F', in combination with a chest, A, valves B and B', and ports, pipes, and passages, substantially as described, the whole being applied to a steam-boiler, and operating substantially as set forth.

2. In combination with the two vibrating reservoirs, the weight H, so arranged and operating as to prevent the tendency of one reservoir to balance the other.

3. The arrangement, substantially as described, of the tank Q and the injector, for the purpose specified.

In testimony whereof I have signed my name to this specification in the presence of two subscribing witnesses.

G. ADOLPH RIEDEL.

Witnesses:
 CHARLES E. FOSTER,
 JOHN WHITE.